United States Patent [19]
Morris, Sr.

[11] Patent Number: 5,542,207
[45] Date of Patent: Aug. 6, 1996

[54] PROCESS FOR CONTROLLING INSECT INFESTATIONS IN A STRUCTURE

[75] Inventor: Wayne F. Morris, Sr., Leona Valley, Calif.

[73] Assignee: Home Saving Termite Control, Inc., Leona Valley, Calif.

[21] Appl. No.: 343,845

[22] Filed: Nov. 23, 1994

[51] Int. Cl.$^6$ .................................................. A01M 1/20
[52] U.S. Cl. .................................. 43/132.1; 43/124
[58] Field of Search ..................... 43/131, 124, 132.1, 43/900

[56] References Cited

U.S. PATENT DOCUMENTS

| | | |
|---|---|---|
| 2,981,025 | 4/1961 | Woodson ................................. 43/124 |
| 3,858,346 | 1/1975 | Bailey ...................................... 43/124 |
| 3,894,043 | 7/1975 | Moser et al. . |
| 4,190,686 | 2/1980 | Muis . |
| 4,430,108 | 2/1984 | Hojaji et al. . |
| 4,779,735 | 10/1988 | Kelso, Jr. . |
| 4,889,710 | 12/1989 | Hagarty . |
| 4,958,456 | 9/1990 | Chaudoin ................................ 43/124 |
| 5,058,312 | 10/1991 | Jackson ................................ 43/132.1 |
| 5,094,028 | 3/1992 | Hume . |
| 5,135,750 | 8/1992 | Nakashima . |
| 5,165,199 | 11/1992 | Tallon ...................................... 43/124 |
| 5,178,871 | 1/1993 | Thill . |
| 5,182,305 | 1/1993 | Steltenkamp . |

FOREIGN PATENT DOCUMENTS 0229046  10/1985  Germany .............................. 43/132.1

*Primary Examiner*—Jack W. Lavinder
*Assistant Examiner*—James Miner
*Attorney, Agent, or Firm*—Kelly, Bauersfeld & Lowry

[57] ABSTRACT

A process for eradicating termite infestations in a structure and preventing the reinfestation thereof includes the steps of identifying infested wood members, impregnating the infested wood members with a borate solution, and injecting an amorphous silica gel dust into structural voids adjacent to the exterior of the structure. The borate solution, which is applied to surfaces of the infested wood members, kills existing infestations of kaloterme. The amorphous silica gel dust is electrostatically charged as it is injected into the structural voids so as to cling to the surfaces of exposed wood members. This forms a shield against future infestations. Termite barricades impregnated with the borate solution are also inserted into selected wood members of the structure.

25 Claims, 4 Drawing Sheets

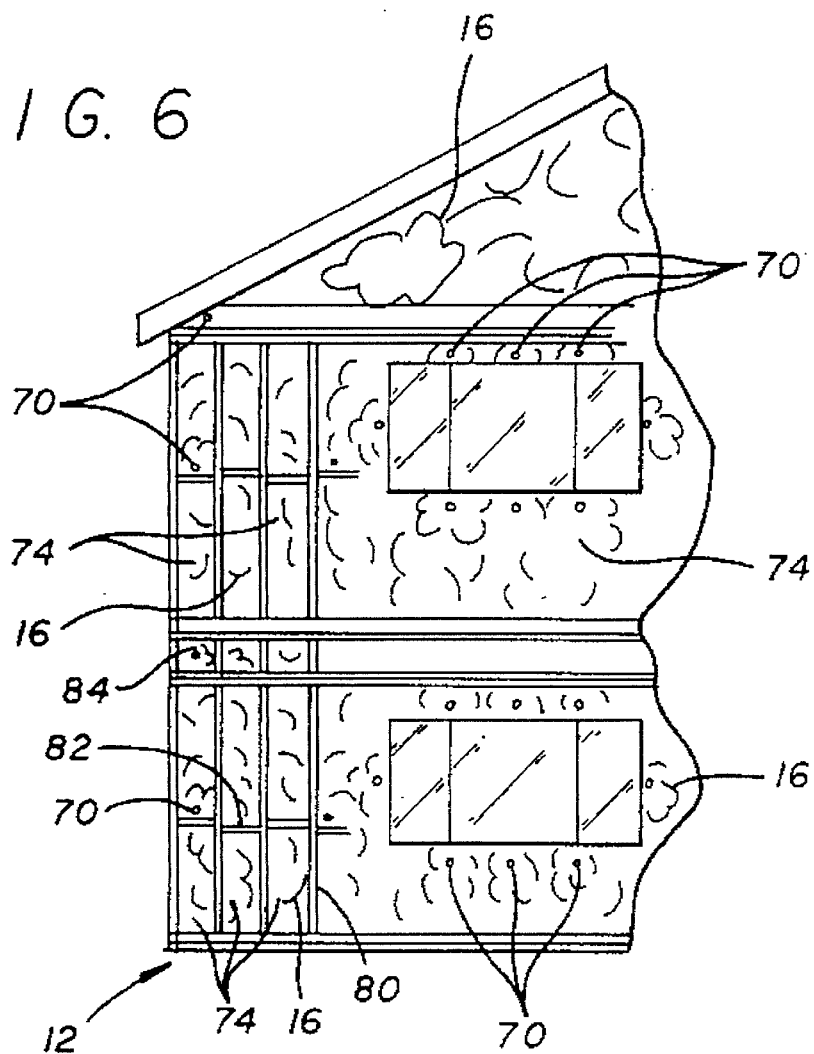
FIG. 6
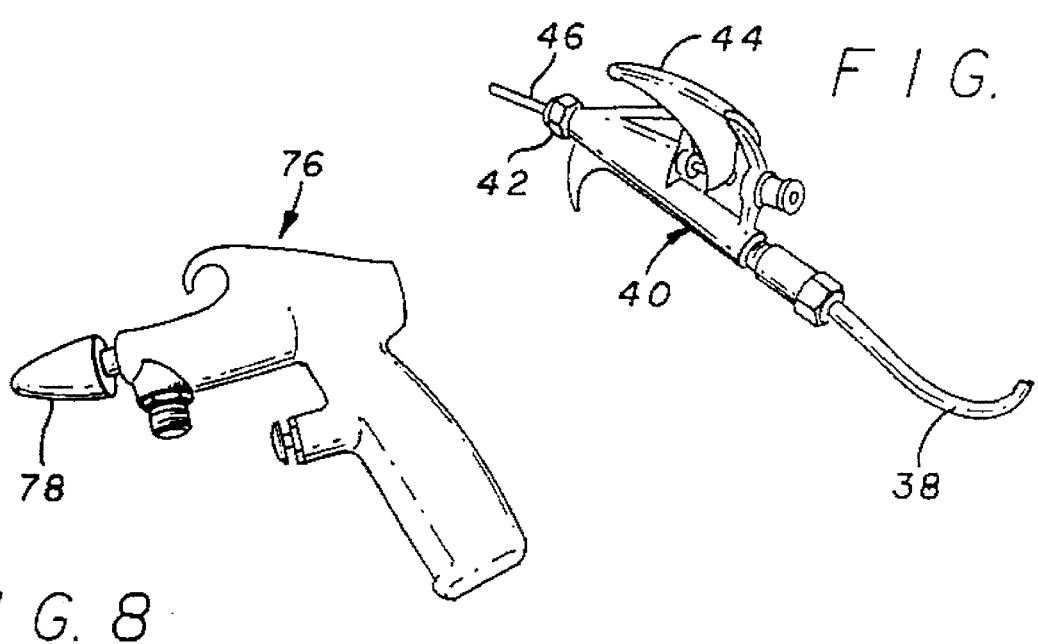
FIG. 7
FIG. 8

PROCESS FOR CONTROLLING INSECT INFESTATIONS IN A STRUCTURE

BACKGROUND OF THE INVENTION

This invention relates generally to processes for controlling insect infestations in a structure. More particularly, the present invention relates a process for eradicating existing termite colonies in a structure and preventing reinfestations through the use of minerals rather than chemical insecticides.

Kaloterme (dry wood termite) infestations in wood structures is a serious problem throughout much of the country. Termites can invade a residence and do serious damage before their presence is determined. Homeowners throughout the country expend significant amounts of money to discover kaloterme invasions, eradicate the termite colonies discovered, repair damage to structure, and inhibit future invasions. Among the procedures available to deal with kaloterme infestations are localized treatments of infested wooden members with a termiticide, and fumigation of the structure.

Fumigation of a structure is quite involved and is viewed as a drastic but necessary step to protect infested structures. Prior to fumigating the structure, all occupants must move out of the structure, all food items not in airtight bottles and cans (including those in refrigerators and freezers), must be removed or put in airtight specially approved plastic bags, and all medications, vitamins, cosmetics, etc., must be removed from the premises or bagged. Further, all live plants and pets must be removed from the premises, burglar alarms should be turned off, any natural gas supply to the premises must be turned off at the meter, trees, plants and shrubs must be trimmed back from the base of all exterior walls a minimum of twelve inches, and all vines climbing on walls and a attached trellises must be removed from the structure or killed. Additionally, property owners are often required to sign forms releasing the fumigation company of all responsibility and liability if damage should occur to roofs, skylights, solar panels, television antenna, rain gutters, landscaping, etc.

Once the structure to be fumigated has been so prepared, employees of the fumigation company must further prepare the structure by installing special tarpaulins over the structure in the form of a "tent". The structure is then ready for the introduction of either methyl bromide or vikane fumigants which, upon contact with kaloterme or wood destroying beetles, eradicates the undesired insect infestation.

Such chemical fumigants and termiticides are known to be hazardous to humans and the environment in general. Termiticides may be fatal if swallowed. Excessive absorption through the skin may be fatal and may cause substantial although temporary eye injury. Many such chemicals are toxic to birds and wildlife, and extremely toxic to fish and aquatic organisms. Moreover, the effects of chemical termiticides and fumigants, although believed to be safe for the intended purpose today, may prove to be unacceptably toxic at a later date as was the case with the chemical Chlordane, once approved by the Environmental Protection Agency but now banned for use by professional exterminators.

Present termite eradication procedures efficiently eliminate the termites that exist in the treated structure during the fumigant exposure time. However, there is absolutely no protection against termite reproductive swarms that could enter the structure again at any time following completion of the fumigation procedure. Thus, many structures require refumigation within two to five years following an initial treatment.

What is needed, therefore, is a process for controlling insect infestations in a structure, which does not require chemical pesticides to accomplish the desired result, but rather utilizes materials that are known be toxic to kaloterme but not to humans and pets. Additionally, there is a need for a process for controlling insect infestations which provides a permanent termite shield for a treated structure to prevent future infestations of wood destroying insects. Such a process should utilize materials that are odorless, do not discolor or stain exterior wood surfaces, and the cost must be comparable to the cost of present fumigation techniques. The present invention fulfills these needs and provides other related advantages.

SUMMARY OF THE INVENTION

The present invention resides in an improved process for controlling insect infestations in a structure, which satisfies the needs set forth above. The process comprises the steps of identifying an infested wood member of the structure, impregnating the infested wood member with a borate solution, and injecting an amorphous silica gel dust into structural voids adjacent to the exterior of the structure. The amorphous silica gel dust and the borate solutions have no acute toxicity level to humans, pets or the environment. Borates are effective in eradicating established termite colonies. Amorphous silica gels have proven useful in the control and prevention of annual alate reproductive termite swarmers from establishing future new colonies.

In accordance with the present invention, actual and probable infested wood members of the structure are first identified. A borate solution is applied to the infested wood members under pressure to impregnate them with the borate solution. In this regard, a closed container for the borate solution is pressurized with compressed air, and a controllable spray nozzle is utilized to dispense the borate solution from the container.

It is often necessary to create openings through a wall of the structure to permit placement of a spray nozzle adjacent to a selected wood member. In order to fully impregnate the infested wood member, a hole is drilled into the wood member, and the borate solution is injected into the drilled hole and simultaneously sprayed onto an exterior surface of the selected wood member.

Apertures are created through walls to give access to structural voids which are adjacent to the exterior of the structure. An electrostatically charged amorphous silica gel dust is injected through these apertures into the structural voids and, preferably, also inside attached columns and pilasters, and attic and subarea spaces of the structure. The amorphous silica gel dust tends to coat wood members with which it comes into contact, to provide a barrier or shield against future insect infestations.

Occasionally it is desirable to construct barricades within the wood members themselves against future infestations, or to eliminate existing colonies. This may be accomplished by impregnating termite barricades with a borate solution, and inserting the termite barricades into a wood member. Preferably, the barricades are inserted into the wood member in a diamond pattern which is calculated to intercept the most likely pathway of termite galleries. Additionally, the termite barricades preferably include an internal void which is filled with a liquid borate solution prior to inserting the barricades into the wood member.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 6 is a fragmented schematic view of a typical structure, illustrating the manner in which an amorphous silica gel dust is injected into structural voids adjacent to the exterior of the structure;

FIG. 7 is a perspective view of a spray nozzle that may be attached to the solution supply tank of FIG. 1, utilized for surface treatment of infested wood members; and FIG. 8 is an elevational perspective view of an alternative spray nozzle having a rubber tip through which amorphous silica gel dust is injected into structural voids adjacent to the exterior of structure.

DETAILED DESCRIPTION OF THE PREFERRED EMBODIMENT

Figure 1:
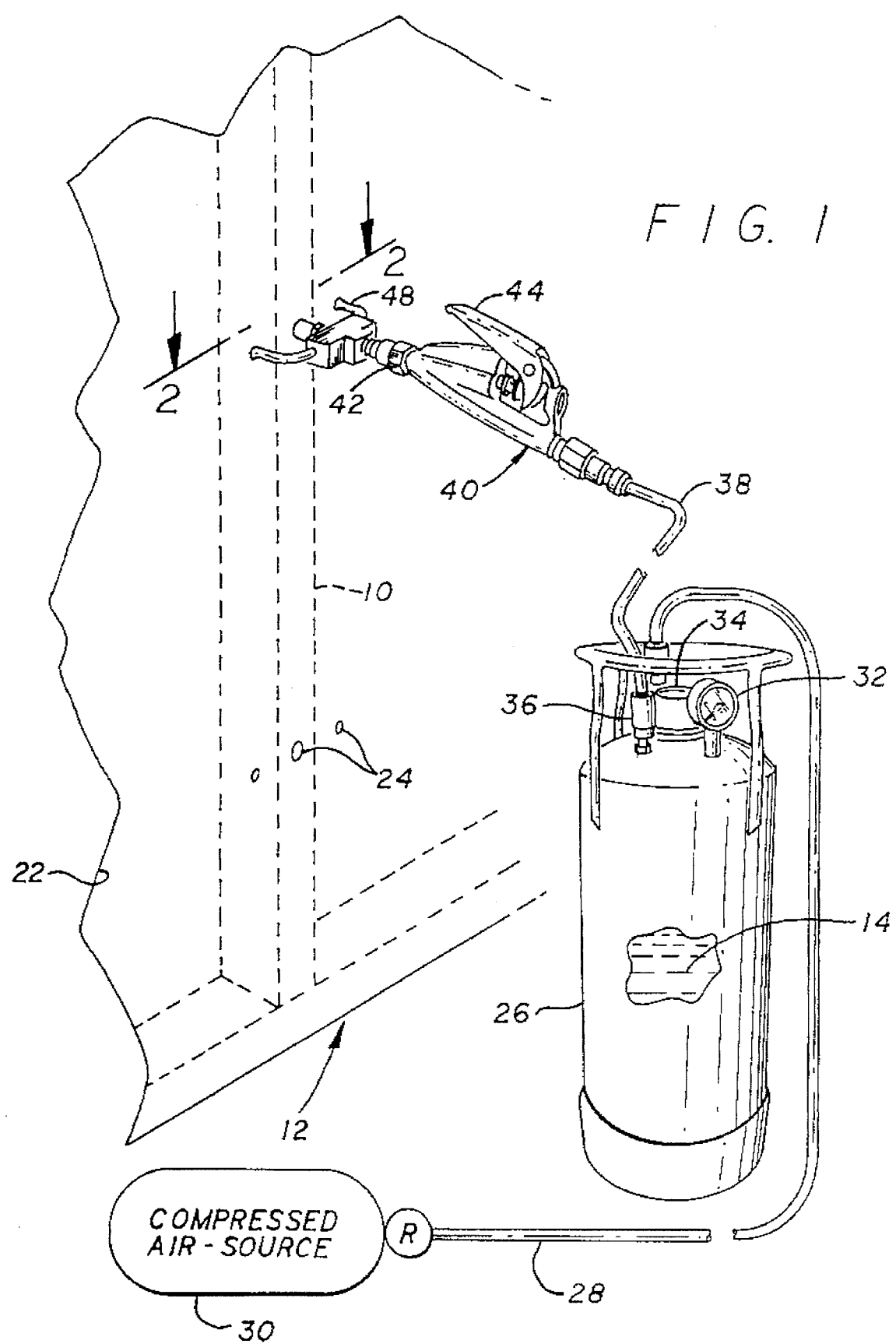
FIG. 1 is a partially fragmented, partially schematic perspective view, illustrating the step of impregnating an infested wood member within a wall of a structure with a borate solution.

As shown in the drawings for purposes of illustration, the present invention is concerned with a process for controlling insect infestations in a structure. The process comprises the steps of, generally, identifying an infested wood member 10 of the structure 12, impregnating the infested wood member with a borate solution 14, and injecting an amorphous silica gel dust 16 into structural voids adjacent to the exterior of the structure 12. Termite barricades 18 (FIGS. 3–5) may also be inserted into a selected wood member 10 of the structure 12 to cross known or suspected termites galleries, for the purpose of poisoning and eliminating complete colonies which may be infesting the wood member.

The solution 14 utilizes borates, a natural mineral, which is very low in toxicity to humans or pets, but which functions as a slow acting stomach poison in termites and other insects. Termites accumulate the ingredient while they are feeding. Since the borate solution 14 is a slow acting poison, the termites move throughout the colony and spread the material by the feeding of nymphs, soldiers and reproductives, or by cannibalism when these termites die. The utilization of the borate solution 14 in connection with the process of the present invention takes advantage of behavioral changes within the termite colony itself, i.e., the slow acting stomach poisoning effect of the borate solution allows an infected termite to move within areas of the structure 12 infested by the termite colony, and when it dies the area is avoided by other termites.

The amorphous silica gel dust 16 utilized in connection with the process of the present invention is also a mineral in the form of a fine white powder/dust. Preferably, the particle size of the amorphous silica gel dust 16 is three microns. The amorphous silica gel dust 16 acts on contact to absorb termite body fluids through its waxy exoskeleton, which causes elimination of the insects by dehydration. The process is called physio-chemical action.

The process for controlling insect infestations utilizing the borate solution 14 and the amorphous silica gel dust 16 described above permits treatment of an infested structure 12 without the use of synthetic chemicals which may break down. The natural minerals provide permanent protection in the treated areas against future infestations. Thus, a treated structure 12 often never needs a full treatment again, in contrast with prior fumigation techniques, as the amorphous silica gel dust 16 creates a barrier on all treated members tending to prevent future infestations. If, however, succeeding inspections reveal further applications are necessary, only localized spot application treatment of a wood member 10 is typically required of those structural members which have been exposed to the elements and are not kept well sealed or painted.

Figure 2:
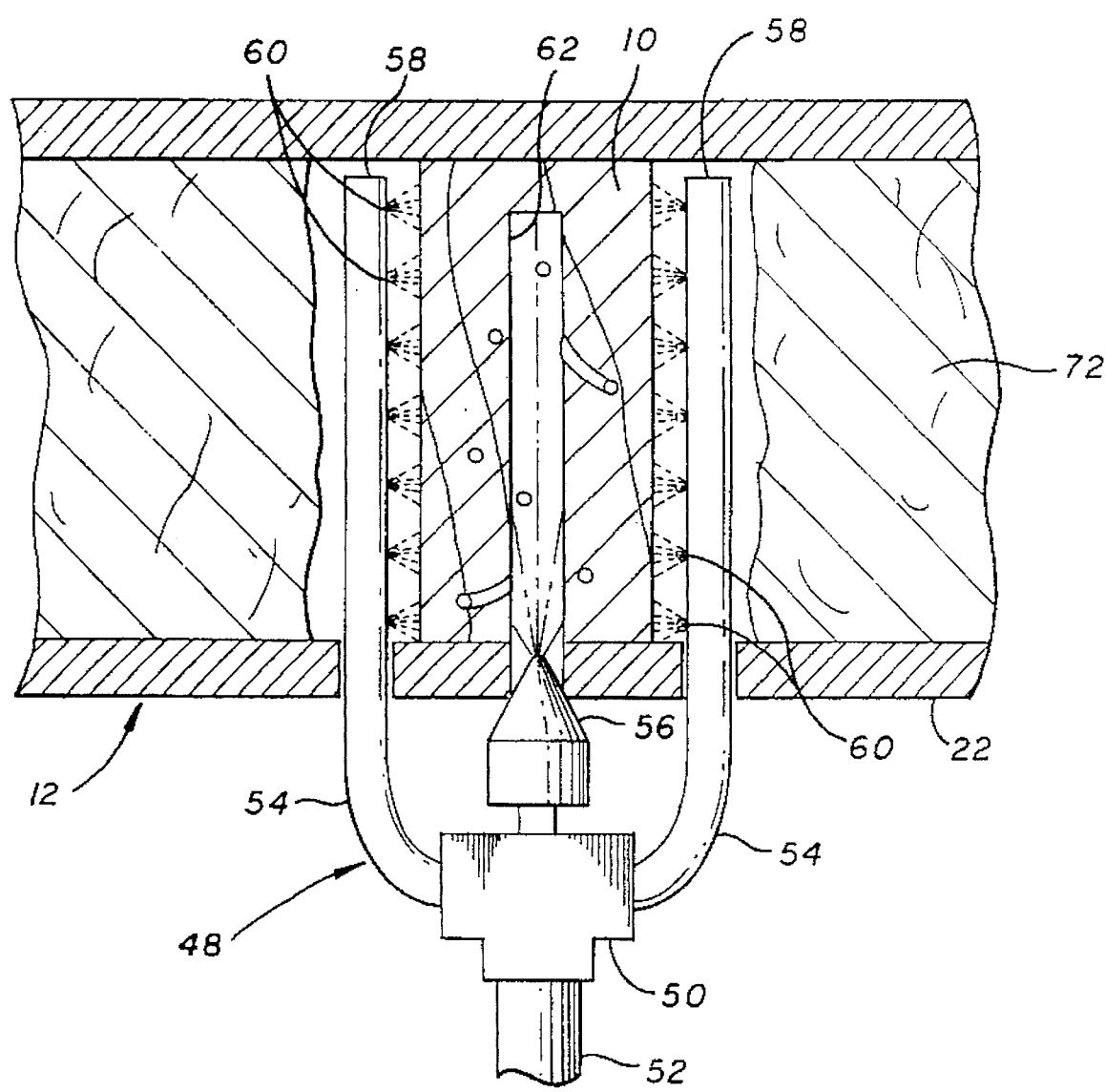
FIG. 2 is an enlarged, fragmented and partially sectional view taken generally along the line 2—2 of FIG. 1, illustrating the manner in which the infested wood member is impregnated with the borate solution utilizing a combination injector and surface applicator device.

In accordance with the present invention, actual and probable infested wood members 10 of the structure 12 must first be identified. This is done utilizing techniques known to those skilled in the art. The actual and probable infested wood members 10 are then treated to eliminate any kaloterme present by impregnating the infested wood members with the borate solution 14 and/or by inserting termite barricades 18 which have been pre-treated with the borate solution 14. With reference to FIGS. 1 and 2, it is sometimes necessary to drill holes through walls 22 of the structure 12 to gain access to the infested wood members 10. A sufficient number of holes 24 are drilled in the walls 22 to adequately treat the infested wood member 10, and preferably an interval of three feet to four feet is desired. The borate solution 14 is stored within a regulated, pressurized stainless steel solution supply tank 26. The tank is connected, via an air hose 28, to a regulated compressed air source 30 which is utilized to pressurize the borate solution 14 within the tank 26. The tank is preferably provided a pressure gauge 32 and a fill cap 34 that locks closed under pressure.

The tank 26 is also provided a quick-connect coupler 36 to which is attached a pressure supply hose 38. Opposite the tank 26, the pressure supply hose 38 is attached to a high pressure liquid flow gun 40 capable of dispensing the pressurized borate solution 14 through a high pressure quick-connect coupler 42 on actuation of a lever 44. A single spray nozzle 46 may be attached to the coupler 42, as shown in FIG. 7, or a combination injector and surface applicator device 48 may be attached thereto (FIGS. 1 and 2).

The combination injector and surface applicator device 48 includes a coupling 50 having a conduit 52 extending therefrom to the high-pressure quick-connect coupler 42. The coupling 50 acts as a manifold for distributing the borate solution 14 into a pair of spray tubes 54 and a hollow, tapered, cone-shaped rubber tip 56. The tip 56 is designed to provide a temporary seal against an aperture extending through a wall and into an infested wood member 10 for purposes of saturating an interior portion of the wood member 10 (see FIG. 2). The spray tubes 54 have plugged ends 58, and a number of orifices 60 through which the borate solution 14 is sprayed on opposing exterior surfaces of the infested wood member 10. By treating a wood member 10 utilizing the combination injector and surface applicator device 48, complete impregnation of the wood member 10 through the area adjacent to the spray tubes 54 is effected. The combination injector and surface applicator device 48 permits the borate solution 14 to be injected directly into a drilled hole 62 of the wood member 10 simultaneously with spraying an exterior surface thereof with the same borate solution.

Figure 3:
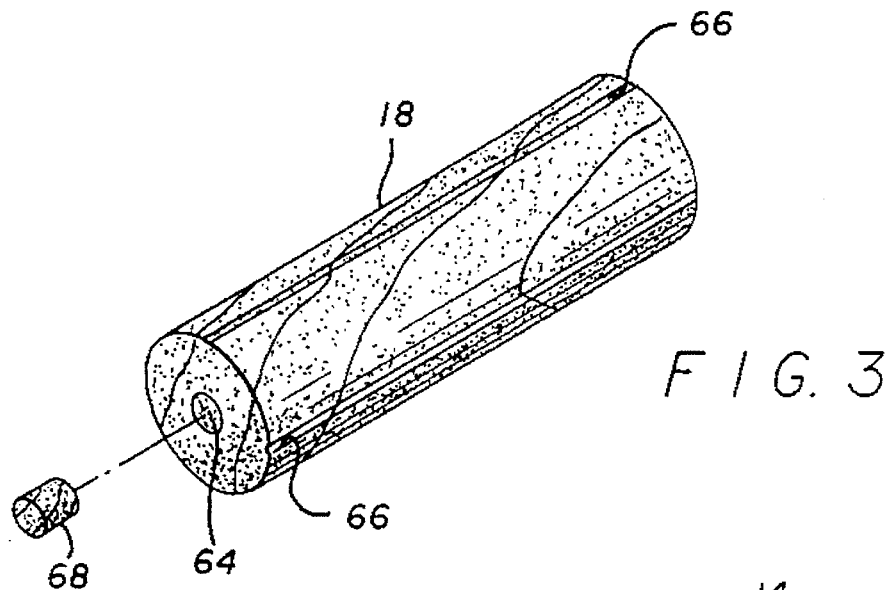
FIG. 3 is a perspective view of a termite barricade insert, shown with a pre-treated plug removed therefrom.
Figure 5:
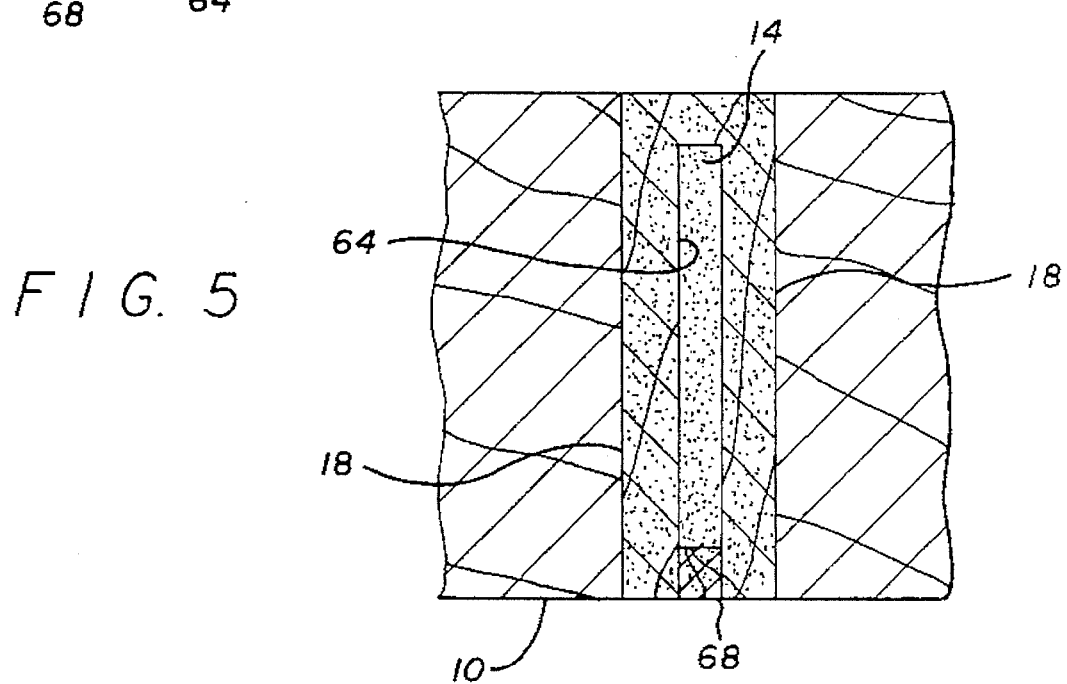
FIG. 5 is an enlarged, fragmented sectional view taken generally along the line 5—5 of FIG. 4.
Figure 4:
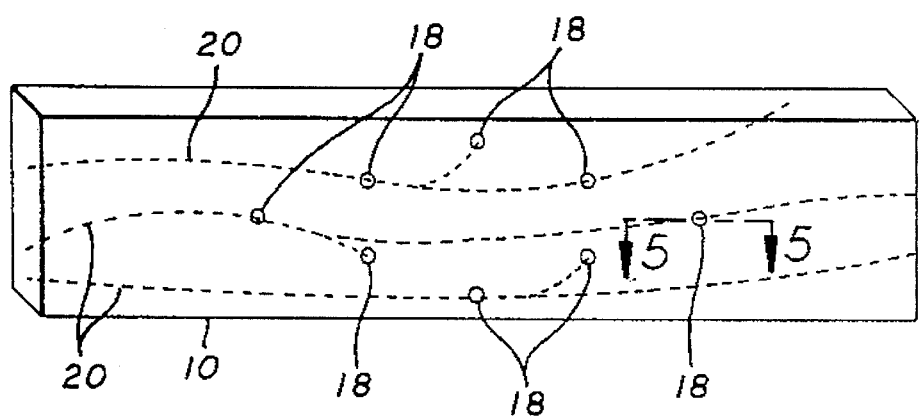
FIG. 4 is a perspective view of a typical wood structural member, showing a preferred diamond pattern for inserting the termite barricade inserts of FIG. 3 therein in order to intercept typical termite galleries.

With reference to FIGS. 3–5, the process also involves the steps of impregnating the termite barricades 18 with the borate solution 14, and inserting the termite barricades into the wood member 10 of the structure 12 in, preferably, a diamond pattern (see FIG. 4). The termite barricades 18 are preferably cylindrical wooden tubes of the same type of wood into which they will be inserted, including a hollow center 64 and grooves 66 which extend the length of the barricade 18. The termite barricades 18 are preferably pre-soaked in the borate solution 14, and prior to inserting them into the wood member 10, the hollow center 64 is filled with the borate solution and plugged using a pre-treated plug 68.

The termite infested wood member 10 is drilled in a manner so as to cross the termite galleries (if that can be ascertained from visual inspection of the wood member), or the wood member 10 is drilled to create the diamond pattern shown in FIG. 4, which is intended to intercept the most likely paths of the termite galleries. The pre-treated termite barricades 18 are installed in the pre-drilled holes so as to block gallery channels. This serves to prevent termite colony workers from travelling through their galleries collecting food supply for the colony. As the termite workers eat away at the gallery channel blockage created by the inserted termite barricades 18, they will consume the borate material contained therein. The borate poison is carried and spread throughout the entire termite colony during normal feeding habits causing complete colony (including queen) elimination. The termite barricades 18 may also be installed in noninfested wood members to aid in preventing termites from establishing colonies in such wood members for the life of the wood member.

Finally, the process of the present invention includes the steps of creating access apertures 70 through walls adjacent to structural voids which are adjacent to the exterior of the structure 12, and injecting the electrostatically charged amorphous silica gel dust 16 through the access apertures into the structural voids (FIGS. 6 and 8). A sufficient number of access apertures 70 must be drilled through the walls to insure total inside space penetration. The amount of Penetration varies with the types of insulation 72 utilized in the structural voids 74 and the tightness of the construction. Testing has shown that normal spacing for the access apertures 70 is typically between three feet and four feet to obtain proper coverage.

The amorphous silica gel dust is supplied under pressure to a suitable spray gun 76 which, Preferably, includes a cone-shaped tip 78 that may act as a temporary seal against the access aperture 70 through which the amorphous silica gel dust 16 is being sprayed. High pressure injection of the dust 16 through the spray gun 76 causes the amorphous silica gel dust to become electrostatically charged, which advantageously causes the dust to cling to the wood members it comes in contact with.

As shown in FIG. 6, in a typical application of the amorphous silica gel dust 16, a sufficient number access apertures 70 must be drilled to permit application of the dust within the attic, between ceiling joists, between wall studs 80, on either sides of fire blocking 82, and between floor joists 84. It is desirable to treat all exposed wood members within all structural voids 74 adjacent to the exterior of the structure 12. As the interior wall spaces of the structural voids 74 are being dusted, if the dust 16 being injected utilizing the spray gun 76 does not escape out through an adjacent access aperture 70, then the spacing of the access apertures 70 is not sufficiently close.

From the foregoing it is to be appreciated that the improved process for controlling insect infestations in the structure 12 in accordance with the present invention, offers significant advantages over standard fumigation techniques in treating infested structures. There are no chemical pesticides to break down, which may cause a loss of residual deterrent against future reinfestation. The borate solution provides a permanent treatment of wood structures, making all treated wood members in the structure virtually termite proof. Although the process of the present invention was primarily designed for kaloterme eradication and control, household pests such as roaches, silverfish, firebrat, spiders, mites and carpenter ants cannot inhabit areas where the borate solution 14 has been applied. Moreover, many of the stringent requirements of structure preparation in connection with standard fumigation techniques are not required in view of the materials utilized in the present invention.

Although a particular process has been described in detail for purposes of illustration, various modifications may be made without departing from the spirit and scope of the invention. Accordingly, the invention is not to be limited, except as by the appended claims.

I claim:

1. A process for controlling insect infestations in a structure, comprising the steps of:

identifying an infested wood member of the structure;

impregnating the infested wood member with a borate solution; and injecting an amorphous silica gel dust into structural voids adjacent to the exterior of the structure.

2. The process of claim 1, wherein the identifying step includes the step of identifying actual and probable infested wood members of the structure.

3. The process of claim 1, wherein the impregnating step includes the step of applying the borate solution under pressure directly to the infested wood member.

4. The process of claim 3, wherein the applying step includes the steps of pressurizing a closed container for the borate solution with compressed air, and utilizing a controllable spray nozzle to dispense the borate solution from the container.

5. The process of claim 3, wherein the applying step includes the steps of simultaneously injecting the borate solution into the wood member and spraying an exterior surface thereof with the borate solution.

6. The process of claim 5, including the step of drilling a hole into the wood member to permit injecting the borate solution therein.

7. The process of claim 6, including the step of creating access apertures through a wall of the structure to permit placement of a spray nozzle adjacent to the wood member.

8. The process of claim 1, including the step of electrostatically charging the amorphous silica gel dust during the injecting step.

9. The process of claim 8, wherein the injecting step includes the steps of injecting the amorphous silica gel dust inside attached columns and pilasters, and attic and subarea spaces of the structure.

10. The process of claim 8, including the step of creating access apertures through walls adjacent to the structural voids through which the amorphous silica gel dust may be sprayed.

11. The process of claim 1, including the step of inserting termite barricades into a selected wood member of the structure.

12. The process of claim 11, including the step of impregnating the termite barricades with a borate solution prior to the inserting step.

13. The process of claim 12, wherein the step of impregnating the termite barricades includes the step of providing each termite barricade with a quantity of liquid borate solution sealed therein prior to the inserting step.

14. The process of claim 12, wherein the inserting step includes the step of placing the termite barricades in a diamond pattern in the selected wood member.

15. A process for controlling insect infestations in a structure, comprising the steps of:

identifying actual and probable infested wood members of the structure;

impregnating the infested wood members by applying a borate solution under pressure directly thereto; and injecting an electrostatically charged amorphous silica gel dust into structural voids adjacent to the exterior of the structure.

16. The process of claim 15, including the step of inserting termite barricades into a selected wood member of the structure.

17. The process of claim 16, including the step of impregnating the termite barricades with the borate solution prior to the inserting step.

18. The process of claim 17, wherein the step of impregnating the termite barricades includes the step of providing each termite barricade with a quantity of liquid borate solution sealed therein prior to the inserting step, and wherein the inserting step includes the step of placing the termite barricade in a diamond pattern in the selected wood member.

19. The process of claim 15, wherein the applying step includes the steps of pressurizing a closed container for the borate solution with compressed air, and utilizing a controllable spray nozzle to dispense the borate solution from the container.

20. The process of claim 15, including the steps of creating access apertures through a wall of the structure to permit placement a spray nozzle adjacent to the wood members, drilling a hole into a selected wood member to permit injecting the borate solution therein, and simultaneously injecting the borate solution into the selected wood member and spraying an exterior surface thereof with the borate solution.

21. The process of claim 15, including the step of creating access apertures through walls adjacent to the structural voids through which the amorphous silica gel dust may be sprayed.

22. A process for controlling insect infestations in a structure, comprising the steps of:

identifying actual and probable infested wood members of the structure;

impregnating the infested wood members by applying a borate solution under pressure directly to the infested wood members, the applying step including the steps of pressurizing a closed container for the borate solution with compressed air, and utilizing a controllable spray nozzle to dispense the borate solution from the container;

creating access apertures through walls adjacent to structural voids which are adjacent to the exterior of the structure; and injecting an electrostatically charged amorphous silica gel dust through the access apertures into the structural voids.

23. The process of claim 22, including the steps of creating openings through a wall of the structure to permit placement of a spray nozzle adjacent to a selected wood member, drilling a hole into the selected wood member, and simultaneously injecting the borate solution into the drilled hole of the selected wood member and spraying an exterior surface thereof with the borate solution.

24. The process of claim 23, including the step of impregnating termite barricades with a borate solution, and inserting the termite barricades into a wood member of the structure in a diamond pattern.

25. The process of claim 24, wherein the step of impregnating the termite barricades includes the step of providing each termite barricade with a quantity of liquid borate solution sealed therein prior to the inserting step.

* * * * *